Patented Oct. 19, 1937

2,096,213

UNITED STATES PATENT OFFICE 2,096,213

A PROCESS OF MAKING BREAD

Frederick Fitz Gerald Tisdall, Toronto, Ontario, Canada, assignor to General Baking Company, New York, N. Y., a corporation of New York No Drawing. Application July 21, 1931,
Serial No. 552,191

5 Claims. (Cl. 99—11)

This invention relates to a method for manufacturing a foodstuff and to the product resulting therefrom. More particularly, it relates to a process of making bread which has vitamin D incorporated therein.

In general, it is an object of the invention to provide a method of the character described which will efficiently attain the result desired and which is simply and economically practised. Another object of the invention is to provide a method whereby vitamin D is homogeneously distributed throughout a cooked product.

A further object is to provide a method whereby a vitamin substantially insoluble in water may be uniformly incorporated as an element in bread along with the shortening.

Still another object is to provide a method for making bread such that a vitamin soluble substantially only in fats or oils will not segregate due to the presence of water.

Another object is to provide as an article of manufacture the product of the processes hereinafter described.

The invention accordingly comprises the several steps and the relation and order of one or more of such steps with respect to each of the others, and the product possessing the features, properties, and the relation of constituents, which are exemplified in the following detailed disclosure, and the scope of the application of which will be indicated in the claims.

There are certain vital organic factors necessary in the diet for the maintenance or recovery of health. One of these factors, termed vitamin D, is intimately connected with many of the functions of the human body. This vitamin is necessary for the growth, renewal and equilibrium of various organs and processes. One of its more patent effects is in bone metabolism where the lack of vitamin D causes rickets and where the presence of vitamin D prevents or cures this disease. Of all the so-called vitamins it is the least widely distributed in nature. Although a minute amount is found in certain food elements, the amount is insufficient for bodily needs.

It has been determined that ergosterol irradiated with ultraviolet light is activated and becomes for dietary purposes identical with vitamin D. Activated ergosterol may be provided in the form of an oil solution, for example, a corn oil solution which has been irradiated, and may be prepared of any desired vitamin potency.

This invention is concerned with a method of incorporating into bread such an oil solution possessing the properties of a vitamin, as for example, vitamin D. The problem presents inherent difficulties due to the tendency of the oil to separate from the water or milk which form a large proportion of the original ingredients. There is also a tendency on the part of the solution to adhere to the walls and parts of the mixing apparatus.

The ergosterol may be activated to such a potency that its presence in the dough will in no way change the normal taste, color or consistency of the baked breadstuff.

The quantity of oil added may take the place of an equivalent amount of other shortening. Thus a pound of corn oil may take the place of a pound of lard.

The flour, water and yeast are usually compounded together in one mixture and the remaining ingredients are mixed together in a batch. The oil containing ergosterol activated either before or after being dissolved therein is mixed with the oily element or elements in the shortening. For example, it may be thoroughly commingled with the lard or butter in a liquid state. The activated shortening is then added to the other constituents of the batch—the salt, malt, etc. Finally the mixture and the batch are mixed together resulting in a homogeneous distribution of the vitamin principle throughout each loaf of bread and without its being concentrated in any particular portion. The last mentioned step is accomplished by stirring, as in a bread mixer, the various parts being completely commingled and blended. By following the above method, the oily activated substance is prevented from floating on the watery ingredients and being lost by adhesion to the manufacturing apparatus. An essential step in the above described process is the preliminary incorporation into the shortening of the activated ergosterol or its activation therein.

The dough may be baked in any approved manner without impairing through heat or otherwise, the vitamin D potency of the irradiated ergosterol content. Baked products containing the activated ergosterol may be kept for days, or as long as they are fit for consumption, without loss of vitamin D potency.

When the term "bread" is used in the specification and claims, it will be understood to include rolls, biscuits and the like, as well as bread.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of making bread comprising combining activated ergosterol with shortening and mixing the combination with the other ingredients in such proportion as to furnish an effective vitamin D content, and baking.

2. A breadstuff comprising shortening as an ingredient, said shortening comprising a relatively small amount of vegetable oil in which has been dissolved a relative concentration of activated ergosterol.

3. A method of making bread comprising forming a mixture of flour, water and yeast forming a batch comprising a mixture of a shortening and a solution of activated ergosterol in vegetable oil, combining said mixture and said batch, stirring to uniformly distribute said activated ergosterol throughout said combined mixture and batch, and baking.

4. A method of making bread which comprises forming a solution in oil of irradiated ergosterol, combining said solution with the usual ingredients of bread dough, said ingredients being present in the usual proportions except that said oil solution replaces an equivalent amount of the usual shortening, said material having such a high vitamin-D potency and being of such nature that its presence in bread dough will in no way change the normal taste, color or consistency of the bread, and baking.

5. A method of making bread which comprises forming a solution in vegetable oil of a material containing vitamin D in concentrated form, thoroughly commingling said oil solution with the shortening ingredients for a batch of dough, the vegetable oil solution taking the place of an equivalent amount of said shortening which would otherwise be employed, mixing the commingled shortening ingredients with the other ingredients of dough to homogeneously distribute the vitamin principle throughout the mass of dough, and baking loaves of bread therefrom.

FREDERICK FITZ GERALD TISDALL.